United States Patent
Marshall, III

(10) Patent No.: US 8,007,205 B2
(45) Date of Patent: Aug. 30, 2011

(54) FOUNDATION WALL VAPOR BARRIER SYSTEM

(76) Inventor: Henry Bennie Marshall, III, Pawleys Island, SC (US)

( * ) Notice: Subject to any disclaimer, the term of this patent is extended or adjusted under 35 U.S.C. 154(b) by 197 days.

(21) Appl. No.: 12/384,734

(22) Filed: Apr. 9, 2009

(65) Prior Publication Data

US 2009/0257830 A1    Oct. 15, 2009

Related U.S. Application Data

(60) Provisional application No. 61/043,651, filed on Apr. 9, 2008.

(51) Int. Cl.
*E02D 19/00* (2006.01)
(52) U.S. Cl. ..................... 405/229; 52/169.14
(58) Field of Classification Search .................. 405/229, 405/303; 52/169.5, 169.14
See application file for complete search history.

(56) References Cited

U.S. PATENT DOCUMENTS

| | | | |
|---|---|---|---|
| 3,035,374 A | | 5/1962 | Burris |
| 3,424,647 A | * | 1/1969 | O'Connor et al. ......... 52/169.14 |
| 4,421,807 A | | 12/1983 | Clausing et al. |
| 4,735,838 A | * | 4/1988 | Roberts et al. ............. 428/40.3 |
| 5,630,299 A | * | 5/1997 | Jackman et al. ............ 52/169.5 |
| 5,981,235 A | | 11/1999 | Vergnano |
| 5,983,586 A | | 11/1999 | Berdan, II et al. |
| 6,575,666 B1 | | 6/2003 | Janesky |
| 6,881,247 B2 | | 4/2005 | Batdorf |
| 6,905,563 B2 | | 6/2005 | Dong |
| 6,926,469 B2 | | 8/2005 | Janesky |
| 7,060,155 B2 | | 6/2006 | Dong et al. |
| 7,735,271 B1 | * | 6/2010 | Shipston et al. .......... 52/169.11 |
| 7,856,767 B2 | * | 12/2010 | Janesky ....................... 405/229 |
| 2004/0040227 A1 | | 3/2004 | Tozaka et al. |
| 2004/0137813 A1 | * | 7/2004 | Faucher ....................... 442/76 |
| 2005/0210772 A1 | | 9/2005 | Janesky |
| 2005/0246990 A1 | | 11/2005 | Geska et al. |
| 2007/0130849 A1 | | 6/2007 | Langer et al. |
| 2007/0157533 A1 | | 7/2007 | Janesky et al. |
| 2007/0175112 A1 | | 8/2007 | Janesky |
| 2007/0204530 A1 | | 9/2007 | Janesky |
| 2007/0224003 A1 | | 9/2007 | Janesky |

* cited by examiner

*Primary Examiner* — Frederick L Lagman
(74) *Attorney, Agent, or Firm* — McNair Law Firm, P.A.; Seann P. Lahey

(57) ABSTRACT

A foundation wall vapor barrier system comprising a wall vapor barrier extending vertically along an interior portion of a foundation wall to resist moisture transfer through the foundation wall. The wall vapor barrier includes a non-woven fibrous core layer, a moisture impervious solid top layer bonded to and completely covering a first side of the core layer, a moisture impervious solid bottom layer bonded to a second side of the core layer opposite the first side, and, an adhesion strip defined by an absence of the bottom layer along a portion of the second side exposing the core layer for receiving adhesive to secure the wall vapor barrier to the foundation wall. A fire retardant low-VOC compliant non-solvent adhesive is disposed in the adhesion strip mounting the core layer to the foundation wall without mechanical fasteners.

18 Claims, 2 Drawing Sheets

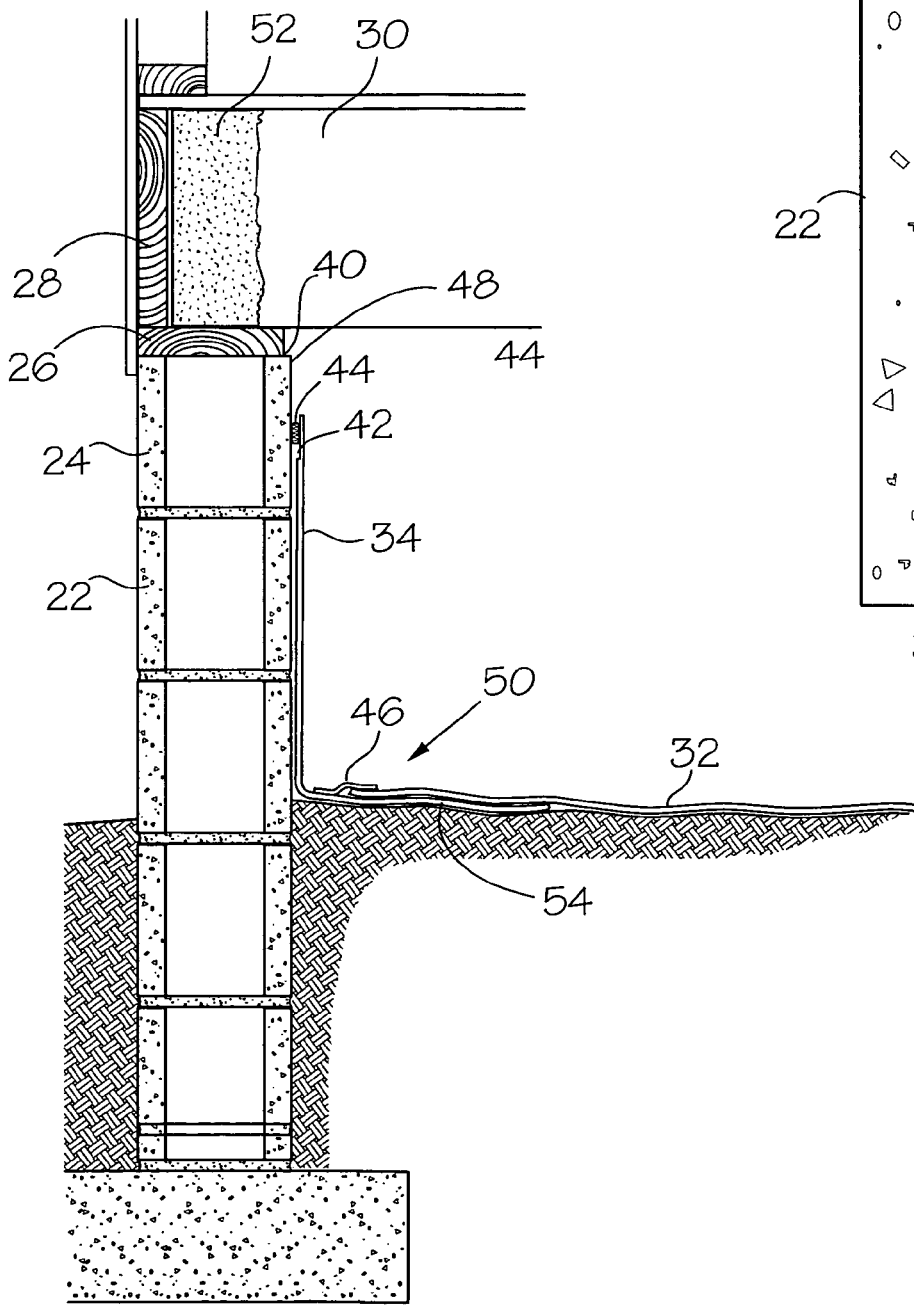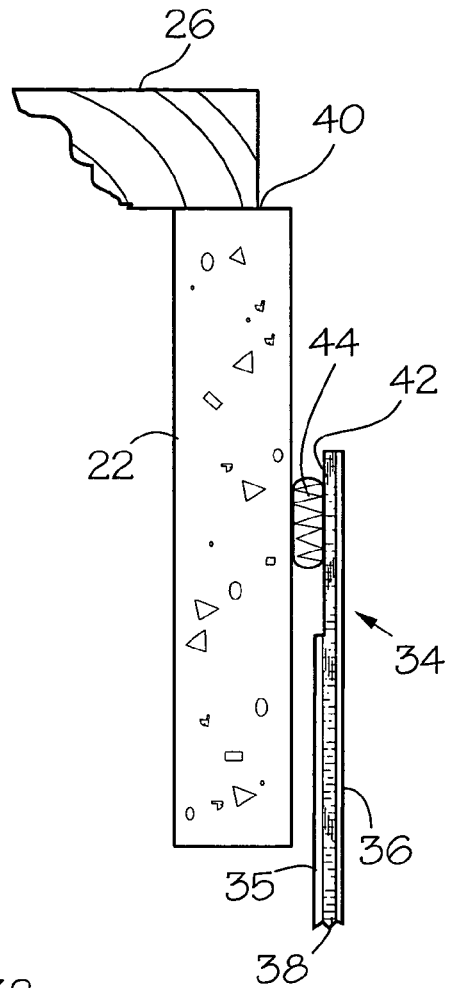

FOUNDATION WALL VAPOR BARRIER SYSTEM

CROSS-REFERENCE TO RELATED APPLICATION

This application claims priority from U.S. Provisional Application No. 61/043,651 filed Apr. 9, 2008.

FIELD OF THE INVENTION

This invention is directed to foundation wall vapor barriers, and more particularly, to a system for attaching a vapor barrier to a foundation wall without the use of mechanical fasteners while using low volatile organic compound (VOC) environmentally friendly adhesive.

BACKGROUND OF THE INVENTION

A crawlspace is a low or narrow space, such as one beneath the upper or lower story of a building that gives workers access to items such as plumbing or wiring equipment. In residential structures, typically, this space is defined by the structures foundation walls so that the crawlspace is enclosed under the lowest floor of the structure. Foundation walls are generally composed of concrete blocks or poured concrete walls. The bottom of the crawlspace is generally ground, which in most cases is simply dirt or sand. In other cases, the ground floor may be poured concrete. The floor above the crawlspace is generally made of wood. Additionally, the crawlspace dirt floor is generally lower then the soil surrounding the structure. Further, the crawlspace is generally not well insulated, and due to leaks, cracks and vents, is generally exposed to the outside environment.

Due to limited air flow in a crawlspace, moisture that seeps out of the ground and into the crawlspace causes the crawlspace to become damp and may stay damp for extended periods of time. This moisture can be very damaging to the structure's foundation walls, floor joists, and other structural components, often leading to premature deterioration of the structure and costly repairs. Additionally, mold, mildew, insects and other undesirable conditions can develop in the crawlspace which can affect the foundation walls and produce an unhealthy environment for inhabitants within the living spaces of the structure above. Additionally, the non-insulated crawlspace allows for the temperature differential between the living space of a home and the crawlspace to approach or be equal to the temperature differential between the living space and the outdoors.

Due to the enclosed nature of the crawlspace, volatile materials, such as construction grade adhesives, that create a hazardous environment, whether through flammable vapors or toxic fumes, is highly undesirable for poorly ventilated spaces. For example, adhesives that produce toxic fumes or flammable vapors are not desirable to use on foundation walls as they can accumulate in the crawlspace, creating a fire hazard due to low ventilation.

Further, such undesirable contaminants in the crawlspace can flow into the air of the structure itself. The natural air flow in a structure is from bottom to top. Based on the principal that warm air rises, as the air in the structure heats up, it moves up through the structure. Once this warm air makes it way up to the attic and roof levels, it will normally be vented out though the soffits or a ridge vent. Much of the air that flows in a structure comes from the crawlspace. In older, more "leaky structures", the air exchange rate can be as high as two air changes per hour. It has been estimated that up to half of the air you breathe on the first floor of a structure is air that came from the crawlspace. If there is high humidity in the crawlspace, there will be higher humidity in the living space. If there is mold and mildew in the crawlspace, there could be mold and mildew in the structure.

Additionally, when air leaks through the foundation walls into the crawlspace and flows into the living space, the temperature differential can undesirably heat or cool the living space therefore requiring more energy to maintain the temperature in the living space. Historically, the design of the crawlspace requires that the crawlspace be open with vents so that air flow can occur in the crawlspace. These vents are an attempt to reduce moisture in the crawlspace. However, these vents allow ambient air to enter the crawlspace.

By providing a vapor barrier to the foundation wall, much of the moisture that enters a crawlspace can be eliminated. A problem arises in that typical construction adhesives capable of securing a plastic liner to a concrete foundation wall have high VOC levels and emit dangerous amounts of toxic and flammable vapor, which is a fire hazard for an enclosed area such as a crawlspace. To avoid the use of such dangerous adhesives, mechanical fasteners have been required to secure the vapor barrier to the foundation wall. This typically involves drilling into the foundation walls to properly secure the vapor barrier to the foundation walls. Installation of such systems has thus largely been limited to professional installers with the tools and abilities to accomplish such a task.

Further, it is desirable for the barrier to contain an antimicrobial property to provide additional protection against undesirable items such as mold and bacteria. With the proper barrier, moisture levels and air infiltration can be better controlled resulting in less of a chance for mold and mildew growth, wood rot, and insects and animals entering the crawlspace.

While there have been several efforts to provide proper barriers for crawlspaces, the installation of these barriers has proven challenging. One principal factor contributing to the difficulty is that the environment of the crawlspace makes adhering the barrier to the foundation walls challenging.

One method for securing the barrier to the foundation walls is disclosed in U.S. Pat. No. 6,575,666. This patent discloses a crawlspace encapsulation system the uses nylon fasteners to secure and support the liner vertically on the foundation walls. The patent states that adhesive tape or a suitable adhesive caulk composition is used to seal the end of the vapor barrier against the top side of the foundation walls, but not to mount or support the liner on the walls. This is because low VOC adhesives suitable for holding to the foundation walls are not suitable for adhering to plastic liners of the type used in crawlspaces. For example, a concrete adhesive, while working well for concrete, does not adhere well to plastic film, particularly the type used for vapor barriers. This difficultly with adhesion is compounded when the plastic film is treated with an antimicrobial substance. Therefore, there is a need for a system for securing a vapor barrier to a foundation wall that does not require mechanical fasteners or high VOC adhesives. Thus, it would be advantageous to have adhesive and other materials for enclosing a crawlspace having desirable fire retardants and low volatile organic compound (VOC) levels.

Accordingly, it is an object of the present invention to provide a system for permanently securing a vapor barrier to a foundation wall using a low VOC adhesive.

It is a further object of the present invention to provide a vapor barrier having fire retardant and antimicrobial properties.

SUMMARY OF THE INVENTION

The above objectives are accomplished according to the present invention by providing a foundation wall vapor barrier system comprising a wall vapor barrier extending vertically along an interior portion of a foundation wall to resist moisture transfer through the foundation wall; the wall vapor barrier having a non-woven fibrous core layer, a moisture impervious solid top layer bonded to and completely covering a first side of the core layer, a moisture impervious solid bottom layer bonded to a second side of the core layer opposite the first side, and, an adhesion strip defined by an absence of the bottom layer along a portion of the second side exposing the core layer for receiving adhesive to secure the wall vapor barrier to the foundation wall; and, a fire retardant low-VOC compliant non-solvent adhesive disposed in the adhesion strip mounting the core layer to the foundation wall.

In a further embodiment, the wall vapor barrier includes a tail section extending horizontally outward from a base of the foundation wall along the ground.

In a further embodiment, a floor cover is included overlapping at least a portion of the tail section along a bottom edge of the wall vapor barrier, wherein the floor cover includes a generally moisture impervious layer selected from the group consisting of plastic film and rubberized sheeting.

In a further embodiment, a sealing tape is disposed over a seam defined by the overlapping of the floor cover on the wall vapor barrier so that the wall vapor barrier and floor cover are secured together on the tail section to resist moisture and vapor transfer through the seam.

In a further embodiment, the floor cover includes a non-woven fibrous core layer, a moisture impervious solid top layer bonded to and completely covering a first side of the core layer, and a moisture impervious solid bottom layer bonded to a second side of the core layer opposite the first side.

In a further embodiment, the floor cover includes properties selected from the group consisting of fire retardant and antimicrobial.

In a further embodiment, the adhesion strip of the wall vapor barrier is generally located along a top edge of the second side adjacent the foundation wall.

In a further embodiment, the adhesion strip exposes approximately a two inch wide section of the core layer extending downward from the top edge to provide surface area for receiving the fire retardant low-VOC compliant non-solvent adhesive and allowing the adhesive to spread over the core layer when pressure is applied to bond the core layer to the foundation wall.

In a further embodiment, the adhesion strip extends longitudinally along a length of the second side parallel to the top edge.

In a further embodiment, the wall vapor barrier includes properties selected from the group consisting of fire retardant and antimicrobial.

In a further embodiment, the non-woven fibrous core layer consists of a spunlace hydro entangled fibrous web that is entangled in both a vertical and horizontal direction to provide strength and puncture resistance.

In a further embodiment, the top layer and the bottom layer of the wall vapor barrier are selected from the group consisting of plastic film and rubberized sheeting.

In a further embodiment, the fire retardant low-VOC compliant non-solvent adhesive off-gases approximately 20 g/l or less.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 shows a cross-section view of a foundation wall having a vapor barrier according to the present invention;

FIG. 1A shows a detailed cross-section view of a portion of FIG. 1 showing the vapor barrier secured to a foundation wall according to the present invention;

DETAILED DESCRIPTION OF THE INVENTION

Figure 2:
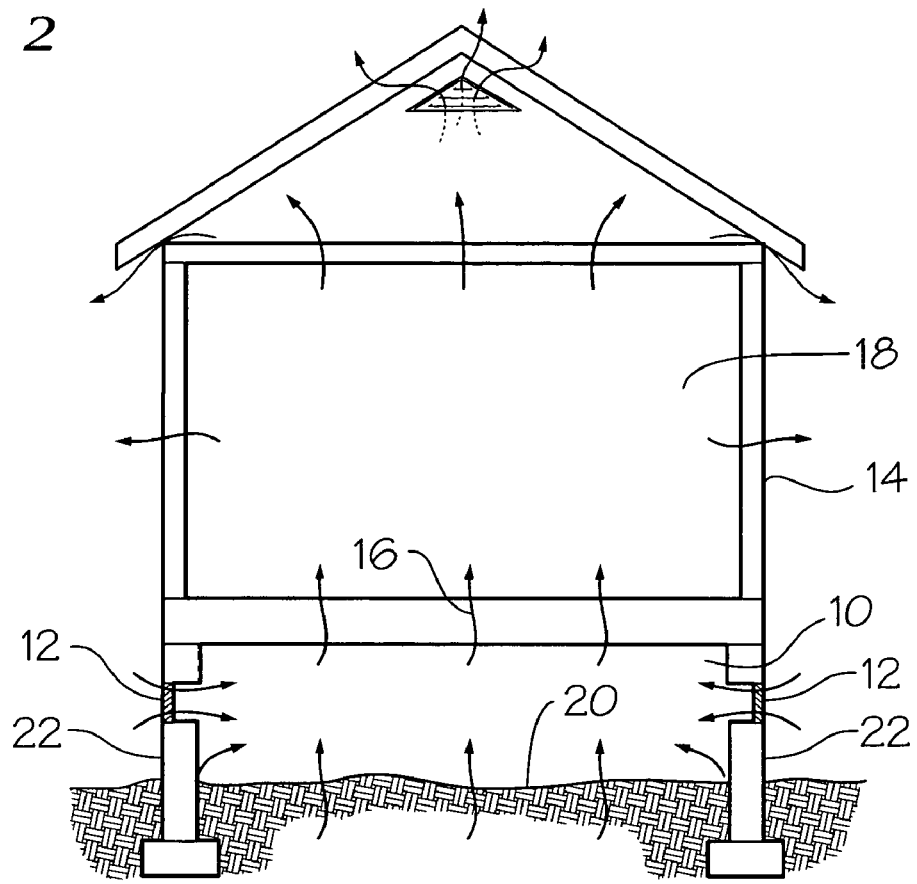
FIG. 2 shows an air flow schematic diagram of a structure involving a crawlspace; and, FIG. 3 shows a detailed view of a vapor barrier according to the present invention.

With reference to the drawings, the invention will now be described in more detail. Referring to FIG. 2, a typical residential structure is shown having crawlspace 10 containing vents 12 that allow air to pass into the crawlspace from the exterior of structure 14. Air from within the crawlspace can travel in a direction shown generally as 16 and into the living space 18. Moisture can seep into the crawlspace through foundation walls 22 and from crawlspace ground floor 20. Additionally, the air flow from the vents causes the air in the crawlspace to be approximately the same temperature as that of the ambient air in the outside environment. By installing a vapor barrier, designated generally as 50, along foundation walls 22 and ground floor 20, the introduction of moisture into crawlspace 10 can be reduced and the flow of air upward through the structure better controlled.

Referring now to FIG. 1, foundation wall 22 comprises a series of blocks 24. These blocks are typically constructed from concrete, and can include sand, fine gravel, cinder, ash or other additives based upon the type of block for construction. Blocks can also be made from brick, metal or other materials. Foundation wall 22 supports sill plate 26 which in turn supports the band joist 28 and floor joist 30. Floor joist 30 supports the lower floor of the structure and also generally defines the ceiling of crawlspace 10. Typically, the blocks are hollow and are not insulated. Preferably, insulation is applied to the foundation, especially the band joist, to insulate the crawlspace from the outside environment. In one embodiment, insulation 52 is applied adjacent to the band joist around the crawlspace. Further, when vents 12 are sealed, insulation is placed against the sealed vent to further insulate the crawlspace.

In the present invention, vapor barrier 50 may be a single piece of material that is installed on crawlspace floor 20 and runs up foundation walls 22. However, in this embodiment, it is necessary for the installers to step on the portion of the vapor barrier that covers the floor of the crawlspace which can potentially lead to damage to the barrier. Therefore, the present invention includes a preferred embodiment where the vapor barrier is in two sections, a floor cover 32 and wall vapor barrier 34. When the barrier is in two sections, there is an advantage in installation since wall vapor barrier 34 can be installed first allowing the individuals that install the barrier to walk on the dirt floor without having to step on the barrier.

The material used for vapor barrier 50, including floor cover 32 and wall vapor barrier 34 can be a highly puncture-resistant plastic film or rubberized sheeting and includes an antimicrobial property to inhibit mold and bacteria that may cause staining, unpleasant odors, and premature deterioration. The vapor barrier can be as thin as 5 mil thick, but preferably is approximately 20-22 mil thick. It is further preferred that vapor barrier 50 also include a fire retardant property. The fire retardant and antimicrobial properties may be inherent in the specific materials used to create vapor barrier 50 or may be added by chemical treatment as is known to those skilled in the art. Additionally, vapor barrier 50 is preferably white in color so that it is easier to see whether mold, insects or other items invade the crawlspace after the vapor barrier is installed.

Figure 3:
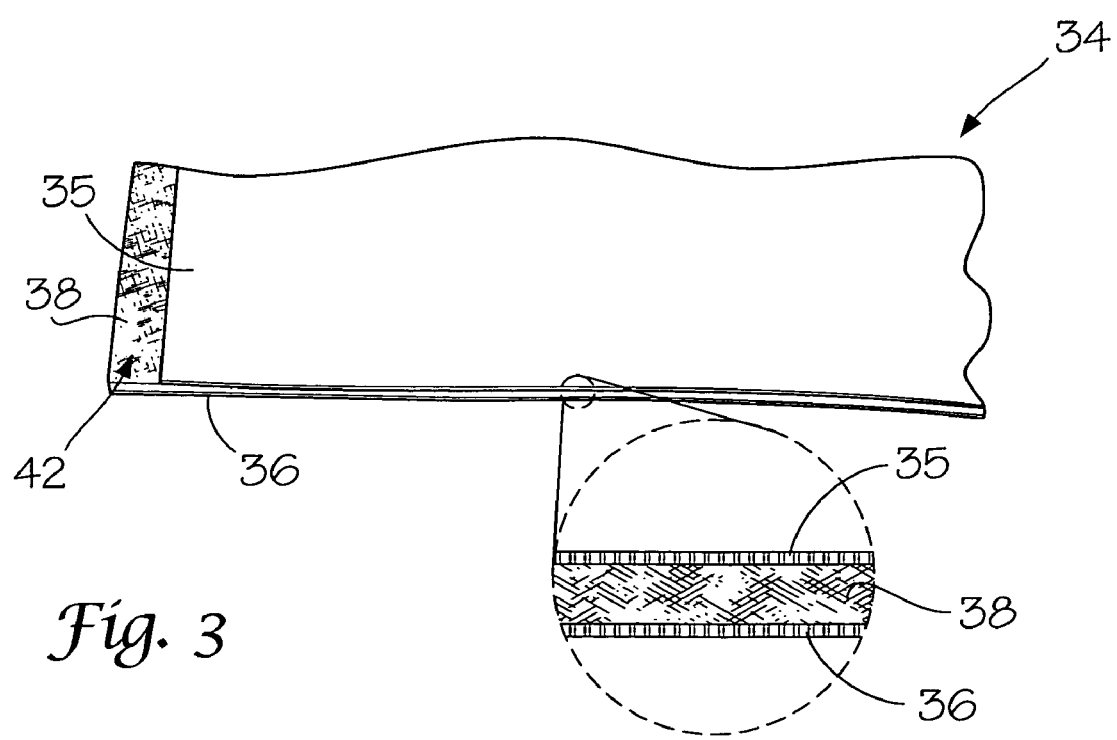

Referring to FIGS. 1A and 3, in a preferred embodiment, wall vapor barrier 34 extends vertically along an interior portion of foundation wall 22 to resist moisture transfer through the foundation walls. Wall vapor barrier 34 preferably has several layers including a non-woven fibrous core layer 38, a moisture impervious solid top layer 36 bonded to and completely covering a first side of core layer 38, and a moisture impervious solid bottom layer 35 bonded to a second side of core layer 38 opposite the first side. In a preferred embodiment, non-woven fibrous core layer 38 consists of a spunlace hydro entangled fibrous web that is entangled in both a vertical and horizontal direction to provide strength and puncture resistance. Further, the top layer and the bottom layer of wall vapor barrier 34 are selected from the group consisting of plastic film and rubberized sheeting.

An adhesion strip 42 is defined by an absence of bottom layer 35 along a portion of the second side exposing core layer 38 for receiving adhesive to secure the wall vapor barrier to the foundation wall. This adhesion strip 42 exposes core layer 38 of wall vapor barrier 34 allowing for a better bonding surface for adhesive 44 to secure core layer 38 to the foundation wall. By exposing the non-woven fibrous core layer, a nonvolatile low-VOC compliant non-solvent adhesive can be used to secure wall vapor barrier 34 to foundation walls 22 without any mechanical fasteners.

The adhesion strip 42 of the vapor barrier 34 is generally located along a top edge of the second side adjacent foundation wall 22. Preferably, adhesion strip 42 exposes approximately a two inch wide section of core layer 38 extending downward from the top edge to provide surface area for receiving the fire retardant low-VOC compliant non-solvent adhesive and allowing the adhesive to spread over the core layer when pressure is applied to bond core layer 38 to the foundation wall. Adhesion strip 42 extends longitudinally along a length of the second side parallel to the top edge to provide continuous area for adhesive 44 to secure and mount wall vapor barrier 34 to the foundation walls.

In the illustrated embodiment, wall vapor barrier 34 includes a tail section 54 extending horizontally outward from a base of foundation wall 22 along the ground. Floor cover 32 is then installed in an overlapping arrangement with at least a portion of tail section 54 along a bottom edge of wall vapor barrier 34. In one embodiment, the floor section overlaps the wall section by at least six inches. A sealing tape 46 is then disposed over a seam defined by the overlapping of floor cover 32 on wall vapor barrier 34 so that the wall vapor barrier and floor cover are secured together on tail section 54 to resist moisture and vapor transfer through the seam. In one embodiment, the sealing tape is four inches wide. Preferably, floor cover 32 is the same material as wall vapor barrier 34 and includes a non-woven fibrous core layer, a moisture impervious solid top layer bonded to and completely covering a first side of the core layer, and a moisture impervious solid bottom layer bonded to a second side of the core layer opposite the first side.

A fire retardant low-VOC compliant non-solvent adhesive 44 is disposed in adhesion strip 42 mounting core layer 38 directly to the foundation walls. By modifying bottom layer 35 to include adhesion strip 42 and thereby exposing interior core layer 38, a better adhesive surface is provided that allows mounting of wall vapor barrier 34 to the foundation walls without other mechanical fasteners or hardware. Further, due to the improved adhesive surface of core layer 38, it becomes possible to use a low-VOC grade adhesive. By using a fire retardant low-VOC compliant non-solvent adhesive, there are significant safety and health benefits from the non-volatile nature of such adhesive in the crawlspace environment where there is limited ventilation. Additionally, the adhesive should be non-toxic since the adhesive will be applied in the crawlspace environment where air is directed upward into the living space above. Accordingly, a sufficient bond is formed to support the wall vapor barrier on foundation walls 22 without the need for mechanical fasteners. The adhesive is preferably a polyurethane base.

VOC levels are expressed in pounds per gallon (lbs/gal) or grams per liter (g/l). Generally, a product is given a low-VOC compliant mark if it has a VOC content that off-gases less than 50 g/l. 20. Preferably, the fire retardant low-VOC compliant non-solvent adhesive 44 of the present invention off-gases approximately 20 g/l or less.

In one embodiment, there is a gap 48 between the top of the foundation wall and the top edge of wall vapor barrier 34. This gap allows for subsequent inspection of the foundation wall such as those for termites. In one embodiment, the gap is three inches.

Further, wall vapor barrier 34 and floor cover 32 can have an R value in that it provides insulation to the foundation walls and crawlspace. This is particularly true when the barrier is constructed with 20 mil material with a core between two external plastic layers. Further, a vapor barrier 50 with a sufficient fire rating and low-VOC is desirable. The barrier can be fire retardant such that the barrier has a fire rating (FR) rating.

Prior to installing the vapor barrier, an antimicrobial spray can be applied so that areas that are prone to moisture can be treated in anticipation of water leaks. For example, under bathrooms and laundry rooms, there is a possibility of water leaking into the crawlspace. The interior walls of the crawlspace that are adjacent to the exterior of the structure can have insulation applied to increase the insulation of the structure. This minimizes the amount of heat transfer from the crawlspace and the exterior of the structure. A sealant can be placed between the top of the foundation wall and the sill plate at 40 to further provide a barrier for moisture, insects, and other items from entering the crawlspace in gaps or spaces between the foundation wall and sill joist. The vapor barrier properties of fire retardant and antimicrobial may be inherent to the specific materials selected, or may be a chemical treatment applied to the vapor barrier.

In alternative embodiments, the invention can include the addition of a dehumidifier which can be installed so that proper humidity levels are maintained. Circulation fans can be placed to assist the dehumidifiers so that even air conditions result. Humidistat controls can be used to conserve energy and have the circulation fans operate according to detected humidity levels rather than simply having fans manually actuated or running all the time. Lighting can be added during the crawlspace enclosing process so that subsequent inspections and future crawlspace access is made easier. In the event that the air is conditioned with the dehumidifiers or fans, vents can be sealed to remove the opening to the exterior of the structure further reducing the moisture that can enter the crawlspace. Humidity can be monitored within the crawlspace by installing a remote monitor panel that displays readouts of sensors within the crawlspace for detecting temperature and humidity.

This invention can be professionally installed or provided in a do-it-yourself kit. In one embodiment, the do-it-yourself kit includes the crawlspace vapor barrier, antimicrobial spray, adhesive and humidity and temperature monitor. The kit can include instructions and specifications for purchasing dehumidifier, circulation fans, humidistat controls for circulation fans, lighting, electrical wiring, boxes and breakers, insulating the foundation wall, minimum inch termite inspection gap, insulating the band joist space, sealing the sill plate, sealing off existing crawlspace vents, access doors and panels, condensate drain piping or pumps and installation instructions.

While a preferred embodiment of the invention has been described using specific terms, such description is for illustrative purposes only, and it is to be understood that changes and variations may be made without departing from the spirit or scope of the following claims.

What is claimed is:

1. A multilayer reinforced vapor barrier adapted for vertically mounting to a foundation wall using only adhesive, said vapor barrier comprising:
    a non-woven fibrous core layer consisting of a spunlace hydro entangled fibrous web that is entangled in both a vertical and horizontal direction to provide strength and puncture resistance;
    a moisture impervious solid top layer bonded to and completely covering a first side of said core layer;
    a moisture impervious solid bottom layer bonded to a second side of said core layer opposite said first side; and,
    an adhesion strip defined by an absence of said bottom layer along a portion of said second side exposing said core layer for receiving adhesive to secure said vapor barrier to the foundation wall.

2. The vapor barrier of claim 1 wherein said adhesion strip is generally located along a top edge of said second side when arranged vertically for mounting to the foundation wall.

3. The vapor barrier of claim 2 wherein said adhesion strip exposes approximately a two inch wide section of said core layer extending downward from said top edge to provide surface area for receiving adhesive and allowing the adhesive to spread over said core layer when pressure is applied to bond said core layer to the foundation wall.

4. The vapor barrier of claim 2 wherein said adhesion strip extends longitudinally along a length of said second side parallel to said top edge.

5. The vapor barrier of claim 1 wherein at least one of said core layer, top layer and bottom layer includes properties selected from the group consisting of fire retardant and antimicrobial.

6. The vapor barrier of claim 1 wherein said top layer and said bottom layer are selected from the group consisting of plastic film and rubberized sheeting.

7. A foundation wall vapor barrier system comprising:
    a wall vapor barrier extending vertically along an interior portion of a foundation wall to resist moisture transfer through said foundation wall;
    said wall vapor barrier having a non-woven fibrous core layer, a moisture impervious solid top layer bonded to and completely covering a first side of said core layer, a moisture impervious solid bottom layer bonded to a second side of said core layer opposite said first side, and, an adhesion strip defined by an absence of said bottom layer along a portion of said second side exposing said core layer for receiving adhesive to secure said wall vapor barrier to said foundation wall; and,
    a fire retardant low-VOC compliant non-solvent adhesive disposed in said adhesion strip mounting said core layer to the foundation wall; and
    wherein said non-woven fibrous core layer consists of a spunlace hydro entangled fibrous web that is entangled in both a vertical and horizontal direction to provide strength and puncture resistance.

8. The system of claim 7 wherein said wall vapor barrier includes a tail section extending horizontally outward from a base of said foundation wall along the ground.

9. The system of claim 8 including a floor cover overlapping at least a portion of said tail section along a bottom edge of said wall vapor barrier, wherein said floor cover includes a generally moisture impervious layer selected from the group consisting of plastic film and rubberized sheeting.

10. The system of claim 9 including a sealing tape disposed over a seam defined by the overlapping of said floor cover on said wall vapor barrier so that said wall vapor barrier and floor cover are secured together on said tail section to resist moisture and vapor transfer through said seam.

11. The system of claim 9 wherein said floor cover includes a non-woven fibrous core layer, a moisture impervious solid top layer bonded to and completely covering a first side of said core layer, and a moisture impervious solid bottom layer bonded to a second side of said core layer opposite said first side.

12. The vapor barrier of claim 9 wherein said floor cover includes properties selected from the group consisting of fire retardant and antimicrobial.

13. The system of claim 7 wherein said adhesion strip of said wall vapor barrier is generally located along a top edge of said second side adjacent said foundation wall.

14. The system of claim 13 wherein said adhesion strip exposes approximately a two inch wide section of said core layer extending downward from said top edge to provide surface area for receiving said fire retardant low-VOC compliant non-solvent adhesive and allowing said adhesive to spread over said core layer when pressure is applied to bond said core layer to said foundation wall.

15. The system of claim 14 wherein said adhesion strip extends longitudinally along a length of said second side parallel to said top edge.

16. The system of claim 7 wherein said wall vapor barrier includes properties selected from the group consisting of fire retardant and antimicrobial.

17. The system of claim 7 wherein said top layer and said bottom layer of said wall vapor barrier are selected from the group consisting of plastic film and rubberized sheeting.

18. The system of claim 7 wherein said fire retardant low-VOC compliant non-solvent adhesive off-gases approximately 20g/l or less.

* * * * *